(12) United States Patent
Meyer et al.

(10) Patent No.: US 10,724,116 B2
(45) Date of Patent: Jul. 28, 2020

(54) PROCESS AND DEVICE FOR BURN-OFF OF PRECIOUS METAL-CONTAINING MATERIALS

(71) Applicant: Heraeus Deutschland GmbH & Co. KG, Hanau (DE)

(72) Inventors: Horst Meyer, Altenstadt (DE); Steffen Voss, Limeshain (DE); Jose Manuel Romero, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 239 days.

(21) Appl. No.: 15/742,152

(22) PCT Filed: Jun. 7, 2016

(86) PCT No.: PCT/EP2016/062878
§ 371 (c)(1),
(2) Date: Jan. 5, 2018

(87) PCT Pub. No.: WO2017/008955
PCT Pub. Date: Jan. 19, 2017

(65) Prior Publication Data
US 2018/0195150 A1 Jul. 12, 2018

(30) Foreign Application Priority Data
Jul. 15, 2015 (EP) .................................... 15176767

(51) Int. Cl.
*C10B 53/07* (2006.01)
*C22B 11/02* (2006.01)
*C22B 3/00* (2006.01)
*B01J 23/44* (2006.01)
*B01J 38/02* (2006.01)

(52) U.S. Cl.
CPC ............ *C22B 11/026* (2013.01); *C10B 53/07* (2013.01); *C22B 11/021* (2013.01); *C22B 11/044* (2013.01); *B01J 23/44* (2013.01); *B01J 38/02* (2013.01); *Y02P 10/214* (2015.11)

(58) Field of Classification Search
CPC .......... B01J 23/44; B01J 38/02; C10B 53/07; C22B 11/021; C22B 11/026; C22B 11/044; Y02P 10/214

USPC .......................................................... 75/631
See application file for complete search history.

(56) References Cited

U.S. PATENT DOCUMENTS

| 3,741,751 A * | 6/1973 | Bone ..................... C22B 21/066 |
| | | 75/680 |
| 4,233,496 A | 11/1980 | Weber et al. |
| 8,188,329 B2 * | 5/2012 | Nowottny ............... C22B 7/001 |
| | | 110/185 |
| 2008/0295749 A1 | 12/2008 | Nowottny et al. |

FOREIGN PATENT DOCUMENTS

| CN | 1067925 A | 1/1993 |
| CN | 101273147 A | 9/2008 |
| WO | WO-2007036334 A2 | 4/2007 |

OTHER PUBLICATIONS

International Search Report issued in PCT/EP2016/062878 dated Jul. 12, 2017.
Hoffman A., "Edlemetall-Recycling: Verschwelung Statt Verbrennung," Wasser, Luft Und Boden, Vereinigte Fachverlag, Mainz, DE, Jan. 1, 2000.

* cited by examiner

*Primary Examiner* — Jie Yang
(74) *Attorney, Agent, or Firm* — Blank Rome LLP

(57) ABSTRACT

Process for removing inorganically— and/or organically-bound carbon from a precious metal-containing composition inside an oven chamber comprising at least one direct burner and at least one exhaust gas conduit, characterised by the sequence of steps of: a) providing a precious metal-containing composition comprising fractions of inorganically— and/or organically-bound carbon inside the oven chamber; b) closing the oven chamber; c) heating the content of the oven chamber by means of at least one direct burner in order to establish a temperature T1 in the range of 450° C. to 1,000° C. and maintaining temperature T1 for 5 min-48 h; whereby, once the oven chamber is closed, any gas exchange between the oven chamber and the surroundings can take place only via the at least one direct burner and the at least one exhaust gas conduit.

10 Claims, No Drawings

PROCESS AND DEVICE FOR BURN-OFF OF PRECIOUS METAL-CONTAINING MATERIALS

This application is a national stage of International Patent Application No. PCT/EP2016/062878, filed Jun. 7, 2016, which claims the benefit of European Patent Application 15176767.0, filed Jul. 15, 2015, each of which are hereby incorporated by reference in their entirety.

BACKGROUND OF THE DISCLOSURE

A multitude of chemical processes on an multi-tonne scale, such as, e.g., reforming for fuel production, the production of monomers for polymer chemistry or the production of ammonia, utilise precious metals and precious metal-containing species as catalysts. As a matter of principle, there are two states, in which the precious metal can be present in the process. The catalytically active species is present either in a homogeneous mixture including the reactants or as a heterogeneous mixture including the reactants, and the catalytically active species is deposited on an inert carrier material in most cases. In many cases, heterogeneous catalysts are preferred since they can be removed easily from the reaction mixture, e.g. by filtration. The precious metals in heterogeneous catalysts are often situated on—usually inert—macroscopic carrier materials, such as, for example, form bodies is made of aluminium oxide, silicon oxide or carbon. The materials used for this type of form body are usually highly porous and thus enable a uniform distribution of the precious metal over a large surface. If carbon is used as carry material, the carbon can consist, e.g., of porous graphite or activated carbon.

The activity of a precious metal-containing catalyst decreases after a certain operating time and the catalyst needs to be replaced. Due to the high price of precious metals, the utilisation of precious metal-containing catalysts is often economical only if the precious metal used in the process can be recovered. Typically, spent heterogeneous precious metal catalysts based on porous carrier materials are subjected to a wet chemical treatment to dissolve and recover the precious metal. Since wet chemical dissolution often takes place in strongly oxidising solutions, inorganically- and/or organically-bound carbon disturbs the process, since it can cause strong foaming, among other effects. Said inorganically- and/or organically-bound carbon can originate, for example, from the carrier material or from process residues (e.g.

starting materials, product residues, side products, solvent).

This is the basis of the need to have processes that can be used to remove inorganically- and/or organically-bound carbon from precious metal-containing compositions to allow the precious metals to be further processed more efficiently.

To this aim, EP1951919 A1 describes a two-step process for removing carbon from precious metal-containing materials, in which a pyrolysis of the volatile components in an inert nitrogen atmosphere takes place first, followed by combusting poorly combustible material in the presence of atmospheric oxygen. It is a disadvantage of the process that nitrogen or other inert gas needs to be heated to the process temperature of approximately 800° C. outside of the oven chamber and needs to then be supplied into the oven chamber for the pyrolysis step. Not only is the use of inert gas comparably expensive, but heating the inert gas to process temperature consumes a significant amount of energy.

DETAILED DESCRIPTION

It is therefore the object of the invention to provide a process for thermal removal of inorganically- and/or organically-bound carbon from precious metal-containing compositions, which does not necessitate the supply of preheated inert gas and thus can be operated more cost- and material-efficiently than is feasible according to the prior art.

The object is met by a process for removing inorganically- and/or organically-bound carbon from a precious metal-containing composition inside an oven chamber comprising at least one direct burner and at least one exhaust gas conduit, characterised by the sequence of steps of:
a) providing a precious metal-containing composition comprising fractions of inorganically- and/or organically-bound carbon inside the oven chamber;
b) closing the oven chamber;
c) heating the content of the oven chamber by means of at least one direct burner in order to establish a temperature T1 in the range of 450° C. to 1,000° C. and maintaining temperature T1 for 5 min-48 h;
whereby, once the oven chamber is closed, any gas exchange between the oven chamber and the surroundings can take place only via the at least one direct burner and the at least one exhaust gas conduit.

The above-mentioned steps of the process according to the invention can take place directly one after the other, whereby this is preferred.

The precious metal-containing composition can be any type of composition that comprises at least one precious metal and further comprises fractions of inorganically- and/or organically-bound carbon or mixtures thereof. Preferably, this concerns spent heterogeneous catalysts.

This context, the precious metal-containing compositions can be solids, liquids or mixtures of solids and liquids. Preferably precious metal-containing compositions can comprise at least one type from the group consisting of powders, ashes, sludges, tars, solutions, dispersions, suspensions, fibrous materials, films/foils, membranes, and granulate materials.

The at least one precious metal can be selected from the group consisting of Pd, Pt, Ir, Ru, Rh, Ag, and Au. The at least one precious metal can be present in elemental and/or chemically bound form in this context. The precious metal compounds can, for example, be inorganic compounds, i.e. precious metal salts, precious metal oxides, or complex compounds.

The carbon that can be removed from the precious metal-containing compositions comprises inorganically-bound carbon, for example in elemental form, such as graphite, activated carbon, soot, glassy carbon or amorphous carbon, and salts, such as, for example, carbonates or bicarbonates. Moreover, the process according to the invention can also be used to remove organic compounds from precious metal-containing compositions, i.e. organically-bound carbon in compounds including further elements, such as, for example, H, N, P, O, and S. In case the precious metal-containing composition originates from an application of catalysis, the carbon can have been either part of the catalyst or a reaction residue such as, e.g., starting materials, side products or solvents.

Hybrid forms of organically- and inorganically-bound carbon such as, e.g., graphite oxide, can just as well be present in the precious metal-containing composition. Moreover, the precious metal-containing composition can comprise inorganically- and organically-bound carbon.

Moreover, the precious metal-containing composition can also comprise, for example, at least one oxide of the elements selected from the group consisting of Si, Al, Ti, Zr, Sn, Cr, Ce, B, Ca, Mg, and Zn.

To be able to operate the process according to the invention in particularly energy-efficient manner, it is preferred to design the oven chamber to be as compact as possible. Accordingly, an oven chamber having a low ratio of oven chamber volume to the volume of precious metal-containing composition is of advantage. Preferably, the ratio of oven chamber volume to the volume of precious metal-containing composition is 1 to 50, in particular 2 to 30, and particularly preferably 3 to 15.

Typically, the process can be implemented in a thermally insulated oven chamber designed for temperatures of up to approximately 1,500° C. Temperatures being specified in the scope of the present invention shall be understood to always referred to the atmospheric temperature at a constant place inside the oven chamber. For example, the temperature can be measured at the exhaust gases outlet.

The oven chamber can be loaded at room temperature with the precious metal-containing composition to be treated or, alternatively, the oven chamber can just as well be loaded at temperatures up to 300° C., e.g. if the oven chamber was used earlier.

It is obvious to a person skilled in the art that the oven chamber can also be loaded in parallel with multiple precious metal-containing compositions of different composition.

Preferably the oxygen content of the oven chamber at the time of loading is the same as that of the surrounding air.

After loading, the oven chamber is being closed. Closing the oven chamber seals the internal space of the oven with respect to the surrounding air such that any gas exchange between the internal space of the oven and the surroundings can only take place via the at least one direct burner and the exhaust gas conduit.

Once the oven chamber is closed, the heating of the precious metal-containing composition can be started. For this purpose, the flame of at least one direct burner is directed into the oven chamber.

The burner can be operated, inter alia, with gas such as, e.g., natural gas, or liquid fuels such as, e.g., petrol or fuel oil. Since this concerns a direct burner, all combustion exhaust gases of the burner are guided into the oven chamber. In contrast, only the heat, but not the exhaust gases of indirect burners reach(es) the oven chamber. The combustion exhaust gases of the burner contain mainly CO, $CO_2$, $H_2O$, and $N_2$. Moreover, traces of $O_2$ and non-combusted hydrocarbons can be present in the exhaust gas.

The at least one direct burner is preferably designed appropriately such that a temperature T1 in the range of 450° C. to 1,000° C. can be attained in the oven chamber within 20 min.

During the heating phase, possibly present volatile hydrocarbon compounds transition into the gas phase and combust in the presence of the oxygen in the oven chamber. This produces mainly $CO_2$ and water. To some extent, incomplete combustion can lead to the formation of soot or carbon monoxide. The combustion of volatile substances from the precious metal-containing composition heats the oven chamber further, in addition to the heat supplied by the at least one direct burner. Accordingly, the temperature T1 can increase to 450° C.-1,000° C. in the oven chamber. Preferably, the temperature T1 increases steadily to its peak value and does not comprise any transient temperature plateaus. Volatile organic substances that were not fully combusted during the heating process can escape through the exhaust gas conduit. Preferably, the exhaust gases of the oven chamber are subjected to a thermal after-burning process ("TNV"). The thermal after-burning process can consist, e.g., of another oven chamber, in which exhaust gas components that exit from the first oven chamber in incompletely oxidised condition, e.g. CO, soot, hydrocarbons, are largely combusted in the presence of excess oxygen.

The combustion of volatile hydrocarbon compounds proceeding during the heating phase consumes oxygen in the oven chamber and thus reduces the oxygen content. Concurrently, the fraction of inert gases, such as $CO_2$ and water vapour, in the atmosphere of the oven chamber increases. As a result, an inert atmosphere of hot combustion exhaust gases is generated. In the context of the present invention, inert gases shall be understood to mean gases that do not undergo any reaction with inorganically- and/or organically-bound carbon at temperatures of up to 1,500° C. and normal pressure. Since the hot inert gases result from combustion processes, there is no need to introduce heated inert gas such as, e.g., $N_2$ into the oven chamber.

Compared to externally preheated inert gas, the use of the inert gas generated in situ leads to significant energy savings. Due to the supply of heat via the at least one direct burner and the development of heat during the combustion of volatile substances, the temperature T1 in the oven chamber can increase to 450° C.-1,000° C., in particular to a temperature T1 in the range of 600° C. to 850° C. The majority of the carbon-containing materials cannot combust any further in this atmosphere of combustion exhaust gases with a reduced oxygen content, but undergoes pyrolysis.

Pyrolysis shall be understood to be the thermal-chemical decomposition of carbon compounds in the absence of oxidation. Pyrolysis decomposes low-volatility compounds into volatile compounds in the absence of oxidation and these can transition into the gas phase at the temperatures predominating in the oven chamber. At the conditions of pyrolysis, there is no further temperature increase resulting from the heat of reaction, since no significant amounts of heat are released during pyrolysis. A constant temperature T1 can become established, which is determined mainly by the supply of heat from the at least one direct burner—preferably in constant operation. In the context of the present invention, a temperature shall be considered to be constant if it changes at a rate of no more than ±10° C./20 min, in particular no more than ±0.5° C./min.

The advantage of pyrolysis as compared to thermal oxidation is the reduced development of heat. As a result, volatile and easily oxidisable substances can also be safely removed from precious metal-containing compositions.

It can be advantageous to treat the precious metal-containing composition with multiple direct burners in order to attain uniform pyrolysis across the entire precious metal-containing composition.

If multiple direct burners are operated in sequence, it is advantageous to make sure that a constant temperature becomes established during treatment of the precious metal-containing composition with the respective burner before switching-on the next burner.

No oxygen is actively supplied into the closed oven chamber during the pyrolysis phase. The gas exchange between the closed oven chamber and the ambient atmosphere takes place only by means of the at least one direct burner and the exhaust gas conduit.

Preferably, the atmosphere in the oven chamber comprises only 1-10% by volume, in particular 2-7% by volume oxygen during the pyrolysis.

The duration of the pyrolysis phase is a function of the amounts and properties of the individual components of a precious metal-containing composition and can be in the range of 5 min to 48 hours. Preferably, the pyrolysis phase takes 15 min-8 hours, in particular 30 min-2 hours.

If a thermal after-burning process is connected to the oven chamber of the present invention, the end of pyrolysis can be detected by means of a temperature drop in the thermal after-burning process. Once the pyrolysis in the oven chamber no longer releases volatile compounds exiting from the oven chamber without being combusted, the temperature in the after-burning process drops, because less combustible material is present in the exhaust gas.

Alternatively, the pyrolysis can also be monitored by means of temperature or gas sensors in the oven chamber. Due to the self-inerting process steps a)-c), it is feasible to easily and safely remove easily combustible substances from precious metal-containing compositions.

If the precious metal composition contains fractions of inorganically —and/or organically-bound carbon that cannot be removed during the pyrolysis phase, optionally, a step d) follows after step c), in which an inert gas/oxygen mixture with an oxygen content of 15-35% by volume is supplied into the oven chamber for establishing a temperature T2 in the range of 500° C. to 1,100° C., and temperature T2 is maintained for 5 min-48 h. Oxygen and inert gas can be supplied into the oven chamber either separately or as a mixture. The inert gas can be, for example, nitrogen, noble gases or $CO_2$. Preferably, ambient air with an oxygen content of approximately 21% by volume and approximately 78% by volume nitrogen is supplied into the oven chamber. At least one direct burner can be active during the supply of an inert gas/oxygen mixture.

Due to the increase of the oxygen content in the atmosphere of the oven chamber, substances that are difficult to oxidise can now be combusted as well. The amount of oxygen supply is preferably adjusted appropriately such that the temperature T2 is a constant temperature in the range of 500° C. to 1,100° C. Preferably, T2 is a constant temperature in the range of 550° C. to 850° C.

During step d), carbon present in the precious metal-containing composition can be removed efficiently and safely by combustion. Due to the preceding pyrolysis, any uncontrolled release of volatile substances during the combustion can be largely prevented. As a result, poorly combustible compounds can be combusted without deflagration or explosion.

Preferably, the atmospheric pressure inside the oven chamber during pyrolysis and oxidative combustion is in the range of 0.1 to 250 mbar lower than the pressure outside the oven chamber. Particularly preferably, the internal pressure in the oven chamber is in the range of 150-200 mbar lower than the pressure outside the oven chamber. A negative pressure in the oven chamber can be attained, for example, through a chimney effect or by arranging in the exhaust gas conduit of the oven chamber a device, which actively removes exhaust gas from the upper chamber. The device can be, for example, a fan or a ventilator.

EXAMPLE

A total of 349.6 kg of a palladium-containing catalyst residue (Pd on $Al_2O_3$) from an organic synthesis with a palladium content of 5% by weight was distributed uniformly over 16 troughs. The troughs were loaded in racks and placed in an oven chamber with a direct burner and thermal after-burning process ("TNV") attached. During the loading process, the temperature of the oven chamber was approximately 200° C. from an earlier process. The oxygen content was equivalent to that of the ambient air. Subsequently, the oven chamber was closed and the thermal after-burning process was ignited. When the thermal after-burning process had reached operating temperature (approx. 900° C.), the first direct burner was ignited. After 60 min, the oven temperature reached a constant value of 816° C. The temperature in the thermal after-burning process was 1,110° C. at this point in time. The increase of the temperature in the thermal after-burning process indicated that combustible substances from the oven chamber had entered the exhaust gas conduit.

Subsequently, the temperature was maintained for another 20 minutes.

In order to reduce the carbon content of the precious metal-containing composition as much as possible, a second burner was ignited that was directed to different regions of the racks holding the troughs than the first burner. The first burner was then switched off.

After approximately 30 minutes, a constant temperature of 610° C. was established, and was maintained for another 20 minutes. The temperature in the thermal after-burning process was 1,100° C. at this point in time. The lowered value of 610° C. in the oven chamber indicated that the development of heat by oxidative combustion in the oven chamber had decreased. The consistently high value of 1,100° C. in the thermal after-burning process indicated that oxidatively combustible substances had escaped from the oven chamber as exhaust gases.

Subsequently, a third direct burner was ignited that was aimed at regions of the rack that had not been heated sufficiently by the first and second burners up to this point of time.

A constant temperature of 620° C. was established after 30 minutes. The temperature in the thermal after-burning process was 990° C. at this point in time. The temperature in the oven chamber was maintained at 620° C. for another two hours. In this context, the starting value of 900° C. was re-established in the thermal after-burning process.

The temperature decrease of more than 200° C. to the starting value in the thermal after-burning process indicated that the pyrolysis process in the oven chamber was completed.

Subsequently, an opening in the oven chamber was actuated and allowed air to be supplied into the oven chamber by means of a fan. Due to the increased oxygen content in the oven atmosphere, even carbon-containing material, which was not removed earlier from the precious metal-containing composition, combusted. Due to ambient air being blown into the oven chamber, the temperature increased again to 800° C. and finally reached a constant value of 600° C. The mean temperature in the thermal after-burning process remained unchanged during the oxidative combustion.

Subsequently, the third burner was switched off and the residue in the troughs was cooled down.

The residue after cooling was determined to be 57.320 kg. The LOI (loss on ignition) of ash thus obtained was determined in the laboratory. For this purpose, 40 g of the cooled-down residue were triturated in a mortar and treated directly with a Bunsen burner flame at 600° C. for 3 hours. The weight loss after burning was 4.5% by weight. Assuming that only carbon-containing substances contribute to the weight reduction by 4.5%, it can be deduced that the residual content of inorganic and/or organic carbon after running the method according to the invention was maximally 4.5% by weight.

Materials comprising an LOI of less than 10% are well-suited for wet chemical processing, in which the individual precious metals can be separated and cleaned.

What is claimed is:

1. A process for removing inorganically- and/or organically-bound carbon from a precious metal-containing composition inside an oven chamber comprising at least one direct burner and at least one exhaust gas conduit, characterised by the sequence of steps of:
    a) providing a precious metal-containing composition comprising fractions of inorganically- and/or organically-bound carbon inside the oven chamber;
    b) closing the oven chamber;
    c) heating the content of the oven chamber by means of at least one direct burner in order to establish a temperature T1 in the range of 450° C. to 1,000° C. and maintaining the temperature T1 for 5 min to 48 h; and
    d) supplying an inert gas/oxygen mixture with an oxygen content of 15-35% by volume into the oven chamber for establishing a temperature T2 in the range of 500° C. to 1,100° C., and maintaining the temperature T2 for 5 min to 48 h;
    whereby, once the oven chamber is closed, any gas exchange between the oven chamber and the surroundings can take place only via the at least one direct burner and the at least one exhaust gas conduit.

2. The process of claim 1, characterised in that the temperature T1 is constant.

3. The process of claim 1, characterised in that the temperature T1 in step c) is in the range of 600° C. to 850° C.

4. The process of claim 1, characterised in that the precious metal-containing composition comprises at least one precious metal from the group consisting of Pd, Pt, Ir, Ru, Rh, Ag, and Au.

5. The process of claim 1, characterised in that the precious metal-containing composition is present as a liquid, as a solid or as a mixture of a liquid and a solid.

6. The process of claim 1, characterised in that the precious metal-containing composition comprises at least one type from the group consisting of powders, ashes, sludges, tars, solutions, dispersions, suspensions, fibrous materials, films/foils, membranes, and granulate materials.

7. The process of claim 1, characterised in that the inert gas is nitrogen.

8. The process of claim 1, characterised in that the pressure in the oven chamber after step b) is in the range of 0.1 to 250 mbar lower than the ambient pressure predominating outside the oven chamber.

9. The process of claim 1, characterised in that the precious metal-containing composition comprises a precious metal content ranging from 0.1 to 90% by weight.

10. The process of claim 1, wherein steps a)-c) have a self-inerting effect.

* * * * *